…

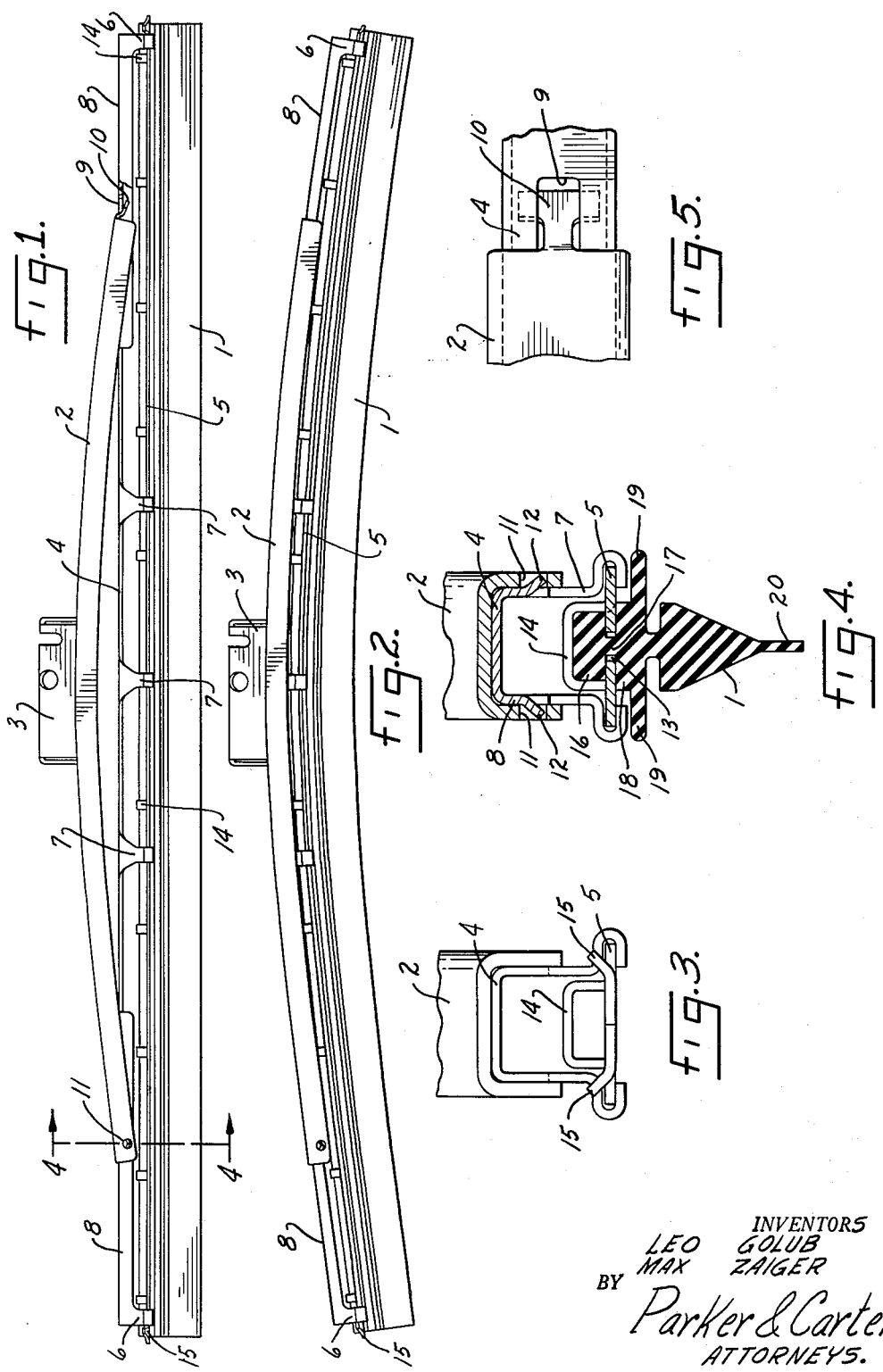

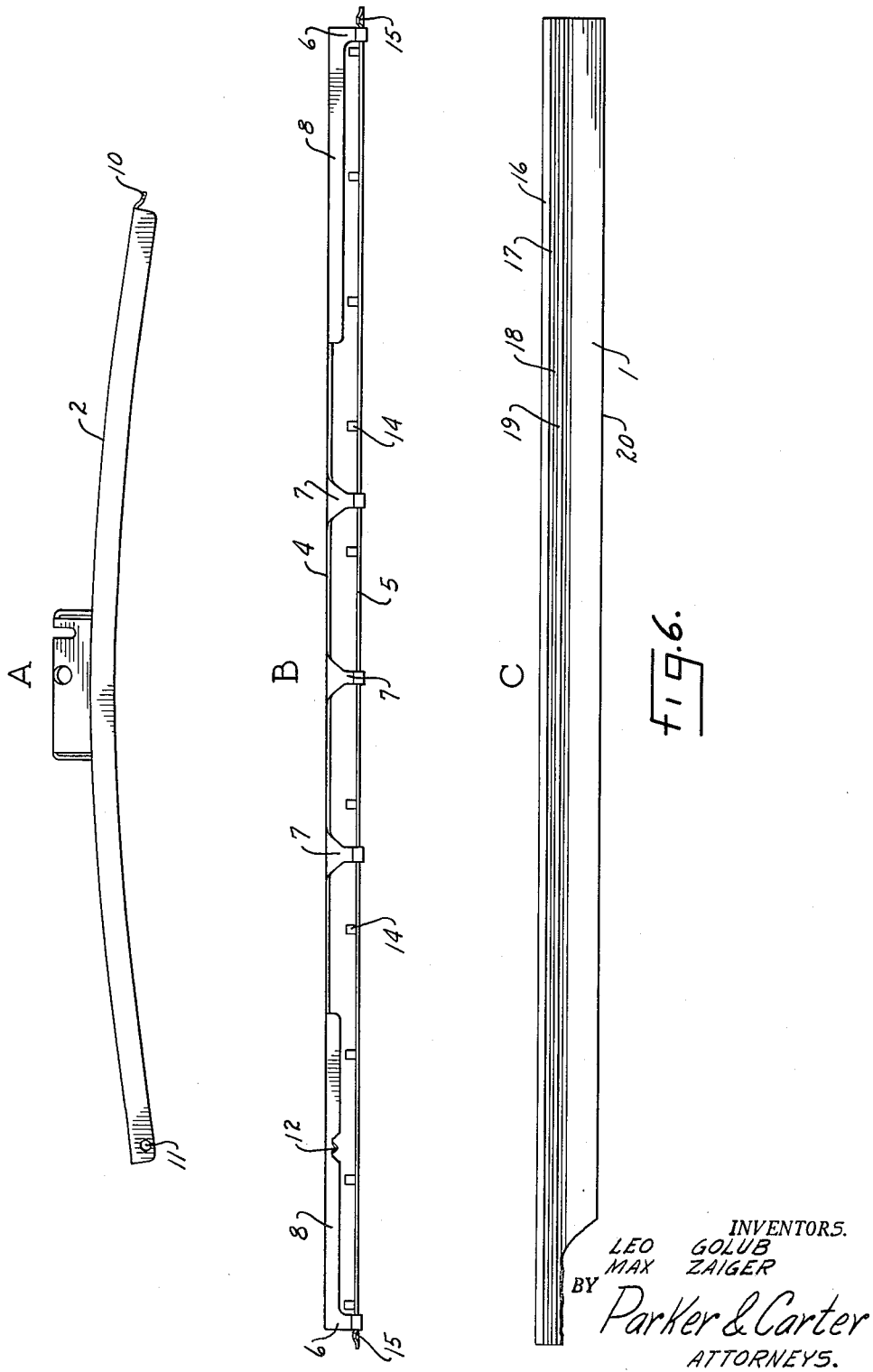

United States Patent Office 3,006,018
Patented Oct. 31, 1961

3,006,018
WINDSHIELD WIPER
Leo Golub, 45 Ruby Ave., Marblehead, Mass., and
Max Zaiger, 49 Atlantic, Swampscott, Mass.
Filed Sept. 26, 1958, Ser. No. 763,703
12 Claims. (Cl. 15—250.42)

This invention relates to automobile windshield wipers and has for one object to provide a wiper which may be used to wipe both curved and flat automobile windshields, windows and the like.

Another object of the invention is to provide greater strength in the center of the blade. This added strength, not found in the "three yoke" prior art type of construction, is important because it reduces twist in operation. It also prevents the blade from jumping, skipping and chattering. The result is better, provides smoother wiping action and uses less motor energy. Increased arm pressures and larger windshields and blades have aggravated this need and this new construction goes far toward answering this need.

The invention is illustrated more or less diagrammatically in the accompanying drawings, wherein—

FIGURE 1 is a side elevation in part section of the wiper in its idle or flat windshield wiping positon;

FIGURE 2 is a similar side elevation showing the position of the parts when wiping a curved windshield;

FIGURE 3 is an end view on an enlarged scale;

FIGURE 4 is a section on an enlarged scale along the line 4—4 of FIGURE 1;

FIGURE 5 is a detail plan view of the portion of the wiper which is in section in FIGURE 1;

FIGURE 6 is an exploded view of the device of FIGURE 1.

Like parts are indicated by like characters throughout the specification and drawings.

An elastomeric or rubber squeegee blade 1 is supported by a multi-leaf spring assembly which leaf spring assembly is in turn supported at two points by a single rigid, curved, channelled yoke or bridge 2, which may be mounted on any suitable windshield wiper arm engaging an anchor socket 3 fixed adjacent the central portion of the yoke. The leaf spring assembly includes an upper spring leaf 4 and a lower parallel spring leaf 5 both extending substantially the length of the squeegee blade and held together in parallelism by clips 6 and 7 integral with the upper leaf spring 4 engaging the opposite edges of the lower leaf 5. The embrace between the clips and the lower leaf 5 limits relative longitudinal movement of the two spring leaves and they are maintained in parallelism thereby throughout their entire length.

Spring leaf 4 at its opposite ends is channelled as at 8, the channel extending both inwardly and outwardly from the points at which the yoke 2 contacts the spring assembly. Thus the flexibility of the leaf spring assembly varies, it being substantially more flexible intermediate its ends than it is in the area adjacent the ends of the squeegee. Thus the pressure applied to the surface to be cleaned is somewhat greater at the ends than intermediate the ends of the wiper to reduce the danger of the ends of the squeegee being blown out of contact with the glass under excessive pressure.

The upper leaf 4 is longitudinally apertured at 9 and is engaged by and interlocked with the T-head holding member 10 at one end of the yoke 2. The other end of the yoke is apertured as at 11, the aperture being penetrated by fingers 12 outwardly bent from the walls of the channel 8 to furnish a pivot connection between the yoke and the leaf spring assembly.

The lower leaf 5 is longitudinally slotted at 13 and the slot is spanned by a multiplicity of integral cross ties 14 which hold the two sides of the leaf in parallelism and fixed relationship with one another.

The ends of the leaf 5 where they project beyond the fingers 6 are upturned as at 15 to limit relative longitudinal movement of the spring leaves 4 and 5 as they bend.

The elastomeric squeegee blade 1 includes a bead 16 which rests upon the upper surface of the spring leaf 5 and is connected by a narrow neck 17 extending through the slot 13 with the abutment 18 engaging the undersurface of the leaf 5. Extending laterally from the lower side of the abutment 18 are flanges 19 which underlie the leaf 5 and project laterally beyond the clips 6 and 7. Downwardly depending from the abutment 18 is the longitudinally necked windshield contacting portion 20 of the squeegee blade. The blade is of generally uniform dimensions and shape throughout its length and approximately co-extensive in length with the spring assembly.

The use and operation of this invention are as follows:

Attention is called to the three separate elements shown in FIGURE 6, which are brought together to form the wiper assembly. These elements are A, the curved, rigid, channelled bridge; B, the flat multileaf, flexible, backing spring; and C, the elastomeric wiper blade.

The two leaves are spaced apart and held in parallelism by the clips shown and the clearance between them provides room for the bead along the upper edge of the squeegee. The ends of the bridge apply the load of the wiper arm to the backing spring at two spaced points, spaced inwardly from the ends of the backing spring.

The channels at the ends of the upper leaf give the spring the differential flexibility necessary to provide the increased pressure toward the ends of the squeegee.

In the interest of simplicity but two spring leaves are shown. The number might be greater and the channelling or stiffening might be applied to any one or more of the leaves, it being necessary only that the spring assembly be stiff enough to support the pressure applied at two spaced points by the bridge and to insure that the pressure applied at the ends of the squeegee be greater than the pressure applied intermediate its ends.

In the specification and claims, the words "multi-leaf" have been used meaning, of course, two or more leaves. The leaves must be joined together to prevent longitudinal displacement of the leaves, but must be free to yield in the usual way as is customary with leaf springs.

I claim:

1. A windshield wiper blade assembly comprising a flat, multi-leaf, backing spring, a squeegee wiper blade carried by the spring, extending from end to end thereof, a stiff bridge member anchored at each end on the spring, at points spaced from the ends thereof, means for connecting the bridge to a windshield wiper arm, one leaf of the spring being inflexible adjacent each end and flexible between the inflexible ends.

2. A windshield wiper blade assembly comprising a flat, multi-leaf, backing spring, a squeegee wiper blade carried by the spring, extending from end to end thereof, a stiff bridge member anchored at each end on the spring, at points spaced from the ends thereof, means for connecting the bridge to a windshield wiper arm, and lock means positively holding the leaves of the spring out of contact with and in general parallelism with one another, the squeegee blade having a bead along the upper edge thereof fastened between two of the adjacent spring leaves.

3. A windshield wiper blade assembly comprising a flat, multi-leaf, backing spring, a squeegee wiper blade carried by the spring, extending from end to end thereof, a stiff bridge member anchored at each end on the spring, at points spaced from the ends thereof, means for connecting the bridge to a windshield wiper arm, and lock means positively holding the leaves of the spring out of contact with and in general parallelism with one another, the squeegee blade having a bead along the upper edge thereof fastened between two of the adjacent spring leaves, one of the leaves being longitudinally slotted to receive a portion of the squeegee below the bead.

4. A windshield wiper blade assembly comprising a flat, multi-leaf, backing spring, a squeegee wiper blade carried by the spring, extending from end to end thereof, a stiff bridge member anchored at each end on the spring, at points spaced from the ends thereof, means for connecting the bridge to a windshield wiper arm, lock means positively holding the leaves of the spring out of contact with and in general parallelism with one another, the squeegee blade having a bead along the upper edge thereof fastened between two of the adjacent spring leaves, one of the leaves being longitudinally slotted to receive a portion of the squeegee below the bead, and integral tie members bridging the slot and holding the two sides of the spring in fixed parallel relation.

5. A windshield wiper blade assembly comprising a flat, multi-leaf, backing spring, a squeegee wiper blade carried by the spring, extending from end to end thereof, a stiff bridge member anchored at each end on the spring, at points spaced from the ends thereof, means for connecting the bridge to a windshield wiper arm, one of the leaves being inflexible adjacent the ends thereof and flexible throughout its entire length between the inflexible ends, the anchorage points of the bridge being located intermediate the ends of the inflexible portion of the spring leaf.

6. A wiper for curved automobile windshields including a rigid bridge adapted to be supported by a windshield wiper arm, a multi-leaf backing spring carried by, extending longitudinally of, and projecting beyond the ends of the bridge, the backing spring being generally inflexible in the direction parallel to the surface to be wiped and flexible in a direction perpendicular thereto, one leaf of the spring being inflexible at the ends thereof and uniformly flexible throughout its length between the inflexible ends, an elastomeric wiping blade carried by the spring and extending from end to end thereof, the backing spring including at least two parallel spring leaves of substantially equal length.

7. A wiper for curved automobile windshields including a rigid bridge adapted to be supported by a windshield wiper arm, a multi-leaf backing spring carried by, extending longitudinally of, and projecting beyond the ends of the bridge, the backing spring being generally inflexible in the direction parallel to the surface to be wiped and flexible in a direction perpendicular thereto, the spring being uniformly more flexible between, than adjacent, the ends thereof, an elastomeric wiping blade carried by the spring and extending from end to end thereof, the backing spring including at least two parallel spring leaves of substantially equal length, at least one of the leaves being stiffer toward, than intermediate its ends.

8. A wiper for curved automobile windshields including a rigid bridge adapted to be supported by a windshield wiper arm, a multi-leaf backing spring carried by, extending longitudinally of, and projecting beyond the ends of the bridge, the backing spring being generally inflexible in the direction parallel to the surface to be wiped and flexible in a direction perpendicular thereto, the spring being more flexible between, than adjacent, the ends thereof, an elastomeric wiping blade carried by the spring and extending from end to end thereof, the backing spring including at least two parallel spring leaves of substantially equal length, and means extending between the leaves to lock them in fixed spaced apart parallelism.

9. A wiper for curved automobile windshields including a rigid bridge adapted to be supported by a windshield wiper arm, a multi-leaf backing spring carried by, extending longitudinally of, and projecting beyond the ends of the bridge, the backing spring being generally inflexible in the direction parallel to the surface to be wiped and flexible in a direction perpendicular thereto, the spring being uniformly more flexible between, than adjacent, the ends thereof, an elastomeric wiping blade carried by the spring and extending from end to end thereof, the backing spring including at least two parallel spring leaves.

10. A windshield wiper blade assembly comprising a squeegee blade, a backing strip therefor of substantially uniform flexibility throughout its length, a support strip coextensive with the backing strip inflexible at its ends and flexible between the inflexible ends, means interposed between the flexible portion of the support strip and the backing strip and between the opposite ends of the support strip and the backing strip for holding the two strips in spaced apart general parallelism, a bridge member anchored at each end on the inflexible portions of the support strip and means for connecting the bridge member and a windshield wiper arm.

11. A windshield wiper blade assembly comprising a squeegee blade, a backing strip therefor of substantially uniform flexibility throughout its length, a support strip coextensive with the backing strip inflexible at its ends and flexible between the inflexible ends, means interposed between the flexible portion of the support strip and the backing strip and between the opposite ends of the support strip and the backing strip for holding the two strips in spaced apart general parallelism, a bridge member anchored at each end on the inflexible portions of the support strip and means for connecting the bridge member and a windshield wiper arm, the backing strip being free to bend independent of the support strip in the area coextensive with the inflexible ends thereof.

12. A windshield wiper comprising a pair of flat spring strips, a squeegee blade carried by one of them, means for holding the two strips in spaced apart general parallel relationship throughout their entire equal lengths, the second strip being substantially inflexible from its ends inwardly a distance short of the center thereof, a bridge member interlocking with the second strip at points substantially half-way between the ends of the inflexible portion.

References Cited in the file of this patent

UNITED STATES PATENTS

| 2,583,710 | Scinta | Jan. 29, 1952 |
| 2,859,468 | O'Shei | Nov. 11, 1958 |

FOREIGN PATENTS

| 454,332 | Canada | Jan. 25, 1949 |
| 619,320 | Great Britain | Mar. 8, 1949 |
| 67,859 | France | Oct. 14, 1957 |
| | (Addition to No. 1,033,521) | |
| F.17,814 11/63c | Germany | Dec. 20, 1956 |